April 15, 1958

J. B. DYER ET AL 2,830,457

MECHANICAL MOVEMENT MECHANISM

Filed April 6, 1953

INVENTORS
JOHN B. DYER
BY WILLIAM K. SCHNEPF

George H. Strickland
THEIR ATTORNEY

United States Patent Office 2,830,457
Patented Apr. 15, 1958

2,830,457

MECHANICAL MOVEMENT MECHANISM

John B. Dyer, Syracuse, and William K. Schnepf, Webster, N. Y., assignors to General Motors Corporation, Detroit, Mich., a corporation of Delaware Application April 6, 1953, Serial No. 347,025

7 Claims. (Cl. 74—70)

The present invention pertains to mechanical movements, and more particularly to a mechanical movement for converting rotation to oscillation including means for varying the amplitude of oscillation.

Numerous mechanical movements have been developed for converting rotation into oscillation. In addition, some of the previously developed mechanical movements for converting rotation into oscillation include means for varying the amplitude of oscillation. This invention relates to mechanical movement of the aforementioned character wherein the mechanism includes a minimum number of component parts. Accordingly, among our objects are the provision of means for converting rotary motion into oscillatory motion; the further provision of motion converting means of the aforesaid character including means for varying the amplitude of oscillation imparted to an element; and the still further provision of means for interconnecting an element adapted to be oscillated to the actuating mechanism therefor.

The aforementioned and other objects are accomplished in the present invention by providing a mechanical movement wherein the amplitude of oscillation imparted to a driven member is dependent upon the spacial relationship of the driving and driven members. Specifically, the mechanical movement mechanism includes a worm gear, or wheel, rotatably supported in a housing, to which rotation is imparted by a worm from any suitable rotary power source, such as an electric motor. The worm gear is rigidly attached to a shaft which is capable of limited axial movement within the housing to facilitate variation in the amplitude of oscillation imparted to a driven shaft, likewise rotatably supported by a bearing means in the housing, in a manner more fully described hereinafter. The driven member, which in this instance, takes the form of a shaft, is rotatably supported at substantially right angles to the rotative axis of the worm gear. The worm gear is preferably composed of nylon and is provided with an opening constituting a bearing surface, the opening being radially displaced from the rotative axis of the gear. In addition the center line of the bearing opening is disposed at an angle of substantially 45° with respect to the rotative axis of the worm gear.

The driving worm gear and the driven shaft are interconnected by an actuating arm, one end of which is formed with a partially spherical head and mounted for limited universal movement in the opening of the worm gear. The other end of the actuating arm is interconnected with the shaft to be oscillated, the point of interconnection being in alignment with the rotative axis of the worm gear. The interconnection between the arm and the oscillatable driven shaft is rather unique and includes a cross pin of substantially the same diameter as that of the oscillatable shaft. A slot is milled, or otherwise suitably formed, in a medial portion of the oscillatable shaft with a pair of transversely extending projections, or ribs, in the bottom surfaces thereof. The cross pin, which is adapted for attachment at substantially 90° to the axis of the oscillatable driven shaft is likewise formed with a medial slot having a smooth bottom surface. The two slotted portions are then assembled and the ribs, or projections, on the bottom wall of the slot of the oscillatable shaft, after which, the parts are united by welding. The end of the actuating arm, which is attached to the cross pin is bifurcated, or in other words, is in the form of a yoke, with aligned openings adjacent the ends of the bifurcated portion. The cross pin is initially placed through these openings, after which the cross pin is welded to the oscillatable shaft to simplify the manufacturing procedure.

As previously alluded to, the supporting shaft for the worm gear is adapted for limited axial movement toward the oscillatable driven shaft. Axial movement of the worm gear is effected by a cam arrangement, the position of one of the cams being controlled by a manually operable lever. The cam arrangement maintains the worm gear in a position whereby the angle between the connecting arm and the rotative axis of the worm gear is substantially 45°. When the cam surfaces constituting the cam arrangement are moved out of engagement, a spring automatically moves the worm gear a predetermined distance toward the oscillatable driven shaft so as to increase the angle between the actuating arm and the rotative axis of the worm gear. By altering the angular relationship between the actuating arm and the rotative axis of the worm gear, the amplitude of oscillation imparted to the shaft by rotation of the worm gear may be varied. In the present instance by increasing the angle, the amplitude of oscillation imparted to the driven shaft is increased. However, it is to be understood that the present invention pertains to means for varying the amplitude of oscillation, and is not to be limited merely to means for increasing the amplitude of oscillation, as it will be readily apparent to those skilled in the art that by decreasing the angular relationship between the actuating arm and the rotative axis of the worm gear, the amplitude of oscillation imparted to the driven shaft may be decreased.

Further objects and advantages of the present invention will be apparent from the following description, reference being had to the accompanying drawings wherein a preferred embodiment of the present invention is clearly shown.

At the outset, it should be noted that while the mechanical movement herein disclosed is particularly adapted for actuating windshield wiper mechanism, the mechanical movement is capable of diverse usage. Moreover, it is to be understood that any source of rotary power may be employed to rotate the driving member of the mechanism, and reference herein to an electric motor is only by way of example.

Figure 1:
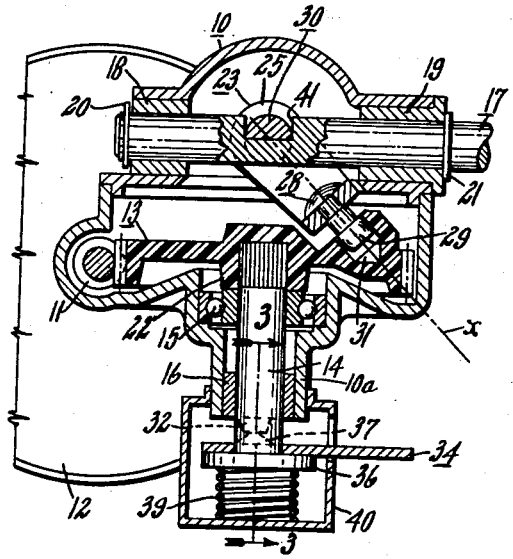
Fig. 1 is a view, partly in section and partly in elevation, showing mechanical movement mechanism constructed according to this invention.
Figure 2:
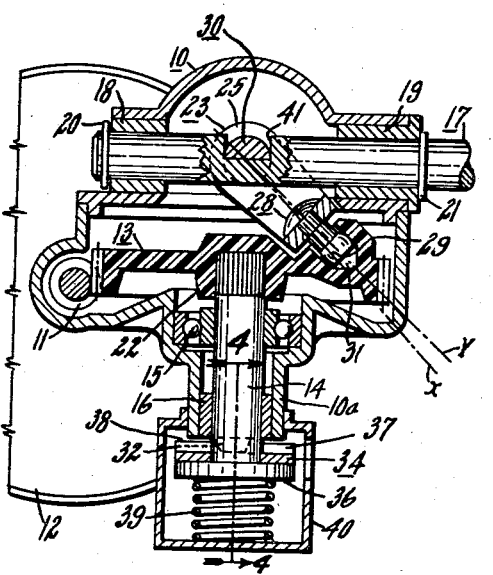
Fig. 2 is a view similar to Fig. 1, in which the mechanism has been adjusted so as to increase the amplitude of oscillation imparted to the driven shaft.

With particular reference to Fig. 1, the motion converting mechanism is depicted as enclosed by a housing 10, through one wall of which a rotatable worm 11 extends. The worm in this instance, is formed on the shaft of an electric motor 12. The worm 11 operatively engages with the toothed surface of a worm wheel, or gear, 13, which is composed of a synthetic linear polyamide, such as nylon. The worm gear 13 is rotatably connected to a shaft 14, which is rotatably supported by bearing means 15 in a portion of the housing 10. The shaft 14 as depicted in Figs. 1 and 2, abuts an end wall of the centrally recessed worm gear 13 so that axial movement of the shaft 14 will impart axial movement to the gear 13, as will be described more particularly hereinafter. The hub of the worm gear 13 is formed with an axially projecting shoulder 22 for a reason which will later be apparent. The shaft 14 is also rotatably supported in the housing 13 by means of a sleeve bearing 16.

The worm gear 13 constitutes the driving member of the mechanical movement. The driven member is constituted by a shaft 17 rotatably supported by bearing means 18 and 19 within the housing 10 and projecting from one side thereof for connection with any suitable means to be oscillated, not shown. The shaft 17 is restrained against axial movement relative to the housing 10 by means of a pair of snap rings 20 and 21. It should be noted that the axis of shaft 17 is disposed at substantially right angles to the axis of shaft 14.

Figure 7:
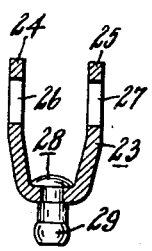
Fig. 7 is a sectional view showing the actuating arm, which interconnects the driving and driven members of the mechanical movement.

The shaft 17 and the worm gear 13 are interconnected by an actuating arm 23. The actuating arm 23 is clearly shown in Fig. 7 and comprises a bifurcated member having arms 24 and 25 constituting a yoke with aligned openings 26 and 27 adjacent the end of arms 24 and 25. Attached to the base of the yoke is a bearing member 28 having a partially spherical head 29.

A cross pin 30 is inserted through the aligned openings 26 and 27 of the yoke arms 24 and 25 and the cross pin 30 is thereafter attached to the shaft 17 in a manner to be described hereinafter. Suffice it here to say that the axis of the shaft 14 is in substantial alignment with the center of cross pin 30, when the cross pin 30 is attached to the shaft 17. The partially spherical head portion 29 of the bearing 28 is positioned in a bearing opening 31, which is formed in a projection on the worm gear 13, with the center line of the opening 31 being at substantially 45° to the rotative axis of the shaft 14. The worm gear 13 is composed of nylon inasmuch as it is well recognized that nylon forms an excellent bearing surface which requires no external lubrication.

From the foregoing it is apparent that upon rotation of the worm 11, rotation will be imparted to the worm gear 13, which, in turn, will rotate the arm, or connecting member, 23, which is connected thereto at a point radially displaced from the rotative axis of the worm gear. As the bearing supported end of the arm 23 rotates, the end of the arm connected to the shaft 17 will impart an oscillatory movement to the shaft. With the construction and arrangement disclosed in Fig. 1, rotation of the worm gear will impart an oscillatory movement to the shaft 17 of substantially 90°. In addition to the arm 23 rotating with the worm gear 13 about the axis of shaft 14, the arm will rotate about its bearing support in the opening 31 of the worm gear due to its connection with the actuating shaft 17 and in this manner impart oscillation to the shaft 17.

We have discovered that by altering the angular relationship between the arm 23 and the axis of shaft 14, the amplitude of oscillation imparted to the shaft 17 by rotation of the worm gear 13 may be varied. In the instant embodiment we disclose means for increasing the amplitude of oscillation. However, with a reversal of the adjustment, we can also decrease the amplitude of oscillation, all within the scope of this invention. As depicted in Fig. 1, the line X illustrates the center line of the actuating arm 23, which intersects the coincident plane of the cross pin 30 and the shaft 14 at the center of cross pin 30, the included angle between line X and the axis of shaft 14 being substantially 45°. In Fig. 2, the center line of the connecting arm 23 is illustrated by line Y and is readily apparent that the included angle between lines X and Y, in Fig. 2, results in an included angle between the center line of the arm 23 and the axis of shaft 14 being greater than 45°. Stated in other words, the amplitude of oscillation imparted to the driven shaft 17 may be varied by varying the distance between the worm gear 13 and the shaft 17. To facilitate linear, or axial, movement of the worm gear 13, the bearing 28 is formed with the partially spherical head 29, which permits a limited amount of universal movement within the bearing opening 31.

Figure 5:
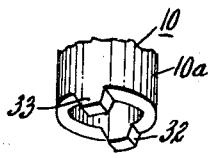
Fig. 5 is a fragmentary perspective view showing a pair of cams forming one part of the cam arrangement for effecting axial movement of the worm gear.
Figure 6:
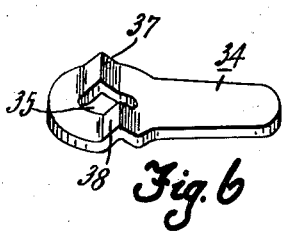
Fig. 6 is a perspective view of the manually movable arm having a pair of cam projections forming the other part of the cam arrangement.

In order to effect axial movement of the worm gear 13 and its shaft 14, we employ a cam arrangement. One end of the housing sleeve 10a is formed with a pair of cam projections 32 and 33, as is seen in Fig. 5. A lever 34 having an opening 35 through which the shaft 14 extends is retained in position by a collar 36 attached to the end of shaft 14. As is depicted particularly in Fig. 6, the portions of the lever 34 surrounding the opening 35 have a pair of cam projections 37 and 38, which are adapted for engagement with cam projections 32 and 33 on the housing sleeve 10a. The shaft 14 is normally biased by means of a compression spring 39, toward the oscillatable shaft 17. One end of the spring 39 bears against the collar 36, the other end of the spring being attached, or merely seating against the inner wall of a housing 40 suitably attached to the housing 10.

Figure 3:
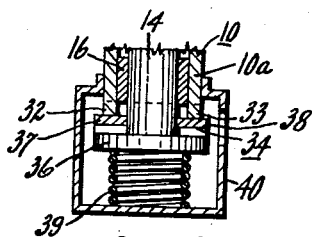
Fig. 3 is a sectional view taken along lines 3—3 of Fig. 1.
Figure 4:
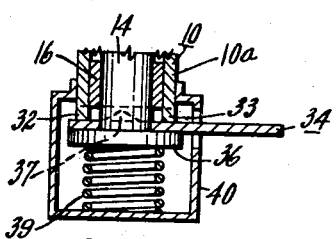
Fig. 4 is a sectional view taken along line 4—4 of Fig. 2.

When the lever 34 is rotated to the position, shown in Figs. 1 and 3, the cam projections 32 and 33 of the sleeve 10a engage the cam projections 37 and 38 of the lever 34 so as to compress the spring 39 and move the shaft 14 downwardly, as viewed in Fig. 1, so that shoulder 22 of the worm gear abuts the inner race of bearing means 15. With the lever 34 in this position, the included angle of line X, in Fig. 1, the rotative axis of shaft 14 is substantially 45°, and, accordingly, upon rotation of the worm gear 13, an oscillatory movement throughout an arc of substantially 90° will be imparted to the shaft 17. When the lever 34 is manually rotated about shaft 14 so that cam projections 37 and 38 thereof are moved out of engagement with cam projections 32 and 33 of sleeve 16, the spring 39 will move the shaft 14 and the worm gear 13 upwardly to the position shown in Fig. 2. Upward movement of the shaft 14 and the worm gear 13 by means of the spring 39 is limited by engagement of cam projections 32 and 33 of the sleeve 16 engaging portions of the lever 34. When the worm gear is moved toward the actuating shaft 17, the included angle between the center line of the actuating arm 23 and the rotative axis of the shaft 14 has been increased to more than 45° and, accordingly, the amplitude of oscillation imparted to the shaft 17 upon rotation of the worm gear 13 will be increased proportionally.

Figure 8:
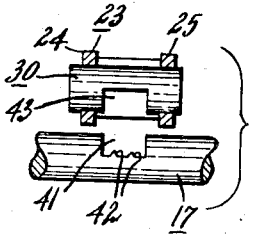
Fig. 8 is an exploded view showing the manner in which the cross pin is connected to the oscillatable shaft.

With particular reference to Fig. 8, the connection between the actuating arm 23, the cross pin 30, and the shaft 17 will now be described. The actuating shaft 17 has a transversely extending slot 41 of rectangular shape milled, or otherwise formed, therein. The bottom of the slot 41 is formed with a plurality of transversely extending ribs, or projections, 42. The cross pin 30, which is round of substantially the same diameter as the shaft 17, also has a transversely extending rectangular slot 43 therein. The slot 43 in the cross pin is constructed to fit the slot 41 in the shaft 17 such that when the parts are assembled, the axes of the cross pin and the shaft will lie in substantially the same plane.

The cross pin 30, the actuating arm 23, and the shaft 17 are assembled in the following manner. Initially, the cross pin is inserted through the aligned openings 26 and 27 of yoke arms 24 and 25; the cross pin is then assembled with the shaft so that the rectangular slots thereof are in mutual engagement, after which the cross pin is projection welded to the actuating shaft, the welding being facilitated by the ribs 42 formed on the bottom of slot 41 in the shaft 17. The construction of the several parts results in an arrangement which greatly simplifies the manufacturing procedure.

From the foregoing, it is readily apparent that the present invention provides an extremely simple mechanical movement for converting rotation into oscillation. Moreover, by providing means for varying the amplitude of oscillation imparted to a driven shaft, the movement readily lends itself to incorporation in windshield wiper actuating mechanisms of the power driven type. Thus, wiper blades, not shown, may be driven by the oscillating shaft throughout a normal wiping range and when the operator desires to park the wiper blades outside of their normal wiping range, he need only rotate the control lever so as to axially displace the worm gear toward the oscillating shaft. As axial movement of the worm gear toward the oscillating shaft increases the amplitude of oscillation, the wiper blades may be moved to a parked position outside of the normal range of vision after which automatic means may be provided for arresting rotation of the worm gear. For example, the mechanism could be employed in windshield wiper actuating mechanism of the type disclosed in copending application, Serial No. 347,021, filed of even date herewith, in the names of John B. Dyer and Walter D. Harrison.

While the embodiment of the present invention as herein disclosed, constitutes a preferred form, it is to be understood that other forms might be adopted.

What is claimed is as follows:

1. In a mechanical movement, a rotatable driving member, an oscillatable driven member having its axis at substantially right angles to the axis of said rotatable driving member, an element interconnecting said driving and driven members, said element having one end operatively connected with said driven member at a point in axial alignment with the axis of said driving member, the other end of said element being loosely connected to said driving member at a point radially spaced from the axis thereof, and means capable of effecting axial movement of said driving member so as to vary the amplitude of oscillation imparted to said driven member by rotation of said driving member, said last recited means including a shaft operatively connected to said driving member, means supporting said shaft for axial movement, and a manually positionable cam operatively connected with said shaft for imparting axial movement thereto.

2. In a mechanical movement, a rotatable driving member, an oscillatable driven member having an axis disposed at substantially right angles to the axis of said driving member, a connecting element having one end operatively connected to said driven member at a point in axial alignment with the axis of said driving member, means connecting the other end of said element to said driving member at a point radially displaced from the axis thereof permitting limited universal movement between said end and said driving element, and means to vary the angular relationship between said element and the axis of said rotatable member so as to vary the amplitude of oscillation imparted to said driven member by rotation of said driving member, said last recited means including a shaft operatively connected to said driving member, means supporting said shaft for axial movement, and a manually positionable cam operatively connected with said shaft for imparting axial movement thereto.

3. The combination set forth in claim 2 wherein said driving member comprises worm gear having an opening formed therein at a point radially displaced from its rotative axis, the center line of said opening being disposed at an acute angle relative to the rotative axis of said gear.

4. The combination set forth in claim 2 wherein the connection between said element and said driven member includes a cross pin rigidly attached to said driven member, said element being pivotally connected with said cross pin.

5. In a mechanical movement, a housing, a member rotatably supported in said housing, means operatively connected with said member for imparting rotation thereto, an oscillatable driven member supported in said housing and having an axis disposed at substantially right angles to the axis of said rotatable driving member, means interconnecting said driving and driven members constructed and arranged to impart oscillation to said driven member upon rotation of said driving member, and means to effect axial movement of said driving member so as to vary the amplitude of oscillation imparted to said driven member, said last recited means including a shaft operatively connected to said driving member, means supporting said shaft for axial movement, and a manually positionable cam operatively connected with said shaft for imparting axial movement thereto.

6. In a mechanical movement, a housing, a member rotatably supported in said housing, means operatively connected with said member for imparting rotation thereto, an oscillatable driven member supported in said housing and having an axis disposed at substantially right angles to the axis of said rotatable driving member, means interconnecting said driving and driven members constructed and arranged to impart oscillation to said driven member upon rotation of said driving member, a shaft operatively connected to said driving member, means supporting said shaft in said housing for axial movement, and means operable to effect axial movement of said shaft and driving member so as to vary the amplitude of oscillation imparted to said driven member including a cam arrangement comprising a fixed sleeve supported by said housing and having an axially projecting cam surface, a lever adapted for rotation about said shaft and having a cooperable cam surface, and resilient means for maintaining the cam surface of said sleeve in engagement with said lever.

7. In a mechanical movement, a housing, a member rotatably supported in said housing, means operatively connected with said member for imparting rotation thereto, an oscillatable driven member supported in said housing and having an axis disposed at substantially right angles to the axis of said rotatable driving member, means interconnecting said driving and driven members constructed and arranged to impart oscillation to said driven member upon rotation of said driving member, a shaft operatively connected to said driving member, means supporting said shaft in said housing for axial movement, and means operable to effect axial movement of said shaft and driving member so as to vary the amplitude of oscillation imparted to said driven member including a cam arrangement comprising a fixed sleeve supported by said housing and having an axially projecting cam surface, a collar attached to said shaft, a lever arranged for rotation about said shaft and abutting one side of said collar, and resilient means engaging the other side of said collar for maintaining the cam surface of said sleeve in engagement with said lever.

References Cited in the file of this patent

UNITED STATES PATENTS

| 722,095 | Geer | Mar. 3, 1903 |
| 1,591,208 | Boerngen | July 6, 1926 |
| 2,002,890 | Greenberg | May 28, 1935 |
| 2,231,474 | Lachman | Feb. 11, 1941 |
| 2,541,790 | Sugden et al. | Feb. 13, 1951 |
| 2,557,912 | Lane | June 19, 1951 |

FOREIGN PATENTS

| 281,842 | Switzerland | July 1, 1952 |